(12) United States Patent
Trim et al.

(10) Patent No.: US 11,741,370 B2
(45) Date of Patent: Aug. 29, 2023

(54) TRANSFER LEARNING BASED ON CROSS-DOMAIN HOMOPHILY INFLUENCES

(71) Applicant: International Business Machines Corporation, Armonk, NY (US)

(72) Inventors: Craig M. Trim, Glendale, CA (US); Aaron K. Baughman, Research Triangle Park, NC (US); Garfield W. Vaughn, Southbury, CT (US); Micah Forster, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 16/553,823

(22) Filed: Aug. 28, 2019

(65) Prior Publication Data

US 2021/0065013 A1 Mar. 4, 2021

(51) Int. Cl.
*G06N 3/086* (2023.01)
*G06N 3/045* (2023.01)

(52) U.S. Cl.
CPC ............. *G06N 3/086* (2013.01); *G06N 3/045* (2023.01)

(58) Field of Classification Search
USPC ........... 706/25; 726/2, 21, 36; 713/150, 163, 713/181; 380/255, 264, 276
See application file for complete search history.

(56) References Cited

U.S. PATENT DOCUMENTS

| | | | | |
|---|---|---|---|---|
| 5,140,530 | A * | 8/1992 | Guha | G06N 3/086 706/31 |
| 6,241,069 | B1 * | 6/2001 | Mazur | G07D 7/04 194/207 |
| 8,795,523 | B2 * | 8/2014 | Su | G01N 1/4044 436/805 |
| 9,542,626 | B2 * | 1/2017 | Martinson | G06F 18/2431 |
| 2002/0143598 | A1 * | 10/2002 | Scheer | G06Q 10/06 705/7.26 |
| 2004/0131998 | A1 * | 7/2004 | Marom | A61N 1/3603 607/45 |
| 2005/0119919 | A1 * | 6/2005 | Eder | G06Q 40/00 705/4 |

(Continued)

FOREIGN PATENT DOCUMENTS

WO    WO 2019/049127    3/2019

OTHER PUBLICATIONS

P. Mell, et al. "*The NIST Definition of Cloud Computing*", NIST Special Publication 800-145. Sep. 2011, Gaithersburg, MD.

(Continued)

*Primary Examiner* — Sharif E Ullah
(74) *Attorney, Agent, or Firm* — Brian Restauro; George S. Blasiak; Heslin Rothenberg Farley & Mesiti P.C.

(57) ABSTRACT

Methods, computer program products, and systems are presented. The methods include, for instance: generating a plurality of deep transfer learning networks including a source deep transfer learning network for a source domain and a target deep transfer learning network for a target domain. Transfer layers of the source deep transfer learning network are encoded to a chromosome, diversified, and integrated with the target deep transfer learning network and the target deep transfer learning network passing a predefined fitness threshold condition is produced.

25 Claims, 7 Drawing Sheets

(56) References Cited

U.S. PATENT DOCUMENTS

| | | | | |
|---|---|---|---|---|
| 2005/0246297 | A1* | 11/2005 | Chen | G06N 3/086 706/15 |
| 2009/0248488 | A1* | 10/2009 | Shah | G06Q 10/0635 705/7.28 |
| 2016/0142266 | A1* | 5/2016 | Carroll | H04L 41/14 706/12 |
| 2016/0171398 | A1* | 6/2016 | Eder | G06Q 30/0201 705/7.28 |
| 2017/0024641 | A1* | 1/2017 | Wierzynski | G06N 3/045 |
| 2017/0193400 | A1* | 7/2017 | Bhaskar | G06N 3/08 |
| 2017/0337464 | A1* | 11/2017 | Rabinowitz | G06N 3/08 |
| 2018/0302306 | A1* | 10/2018 | Carroll | H04L 41/14 |
| 2019/0049127 | A1* | 2/2019 | Shin | F24F 1/02 |
| 2019/0370645 | A1* | 12/2019 | Lee | G06N 3/063 |
| 2021/0064982 | A1* | 3/2021 | Trim | G06N 3/086 |
| 2022/0267756 | A1* | 8/2022 | Lande | C12N 9/22 |

OTHER PUBLICATIONS

D. Roy et al. "*Tree-CNN: a Hierarchical Deep Convolutional Neural Network for Incremental Learning*" Purdue University, arXiv: 1802.05800v2, May 23, 2018.

M. Wang et al. "*Neural Network Meets DCN: Traffic-Driven Topology Adaptation with Deep Learning*", Association for Computing Machinery, Proc. ACM, Meas. Anal. Compu. Syst. vol. 2, No. 2, Article 26, Jun. 2018.

Anonymous, "*Methods for Deep Learning Network Compression for Resource-Constrained Devices*" IPCOM000246620D, Jun. 21, 2016.

Anonymous, "*A Method and System for Single-Image Depth Estimation Using Side Information*" IPCOM000253640D. Apr. 18, 2018.

J. Zhang et al. "*Multi-Task Dictionary Learning Based Convolutional Neural Network for Computer Aided Diagnoses with Longitudinal Images*" University of Michigan, arXiv:1709.00042v1, Aug. 31, 2017.

O. Mayer et al., "*Learning Unified Deep-Features for Multiple Forensic Tasks*" Association for Computing Machinery, IH&MM Sec'18, Jun. 20-22, 2018.

A. Wang et al., "*Deep Transfer Learning for Crop Yield Prediction with Remote Sensing Data*" Association for Computing Machinery, Compass '18, Jun. 20-22, 2018.

"Smarter Supply Chain of the Future: Insights from the Global Chief Supply Chain Officer Study." IBM Institute for Business Value. 2010. https://www-935.ibm.com/services/us/gbs/bus/html/gbs-csco-study.html.

IBM press release. "Aerialtronics Commercial Drones Give IBM Watson Internet of Things a Bird's Eye View." 2016, https://www.ibm.com/press/us/en/pressrelease/50688.wss.

IBM case study. "Jabil Circuit implements a larger-scale analytics solution using IBM Analytics to reduce monthly close time." 2015. https://www-03.ibm.com/software/businesscasestudies/us/en/corp?synkey=M200424F25312E29.

IBM press release. "Local Motors Debuts 'Olli,' the First Self-driving Vehicle to Tap the Power of IBM Watson." 2016. http://www-03.ibm.com/press/us/en/pressrelease/49957.wss.

Lewis, Karen E. "Watson makes building management as a service possible." IBM Cloud computing news. 2017. https://www.ibm.com/blogs/cloud-computing/2017/02/watson-building-management-service/.

Butner, Karen, Dave Lubowe and Louise Skordby. "Who's leading the cogmtive pack in digital operations?" IBM Institute for Business Value. Nov. 2016. https://www.ibm.com/services/us/gbs/thoughtleadership/cognitiveops.

Butner, Karen and Dave Lubowe. "Thinking out of the toolbox: How digital technologies are powering the operations revolution." IBM Institute for Business Value. Nov. 2015. http://www.ibm.com/services/us/gbs/thoughtleadership/operationstoolbox/.

Butner, Karen and Dave Lubowe. "The digital overhaul: Redefining manufacturing in a digital age." IBM Institute for Business Value. May 2015. http://www.ibm.com/services/us/gbs/thoughtleadership/digitalmanufacturing/.

List of IBM Patent and/or Patent Applications treated as related for U.S. Appl. No. 16/553,823, filed Aug. 28, 2019, dated Aug. 28, 2019.

A. Sharma et al. "*Distinguishing Between Personal Preferences and Social influence in Online Activity Feeds*", ACM, CSCW '16, Feb. 27-Mar. 2, 2016.

La Fond et al. "*Randomization Tests for Distinguishing Social Influence and Homophily Effects*," WWW 2010, ACM, Apr. 26-30, 2010.

Q. Han et al. "*The Role of Peer Influence in Churn in Wireless Networks*" ACM, SocialCom '14, Aug. 4-7, 2014.

Y. Sun, "Automatically Designing CNN Architectures Using Genetic Algorithm for Image Classification," (Submitted on Aug. 11, 2018), https://arxiv.org/abs/1808.03818.

Y. Kanada, "Optimizing neural-network learning rate by using a genetic algorithm with per-epoch mutations," 2016 International Joint Conference onNeural Networks (IJCNN), Vancouver, BC, 2016, pp. 1472-1479.

I. Athanasiadis, A Framework of Transfer Learning in Object Detection for Embedded Systems (Submitted on Nov. 12, 2018 (v1), last revised Nov. 24, 2018 (this version, v2)) https://arxiv.org/abs/1811.04863.

F. Assunção. "DENSER: Deep Evolutionarv Network Structured Representation." (Submitted on Jan. 4, 2018 (v1), last revised Jun. 1, 2018 (this version, v3)), https://arxiv.org/abs/1801.01563.

C. Fernando, "PathNet: Evolution Channels Gradient Descent in Super Neural Networks." (Submitted on Jan. 30, 2017) https://arxiv.org/abs/1701.08734.

Maitrei Kohli, "Evolving Neural Networks Using Behavioural Genetic Principles", Mar. 1, 2017, 290 pgs., XP055557613, Retrieved from the Internet URL <http//www.dcs.bbk.ac.uk/site/assets/files/1025/mkohli.pdf>.

Tian Haiman et al., "Automated Neural Network Construction with Similarity Sensitive Evolutionary Algorilluns", 2019 IEEE 20th International Conference on Information Reuse and Integration for Data Science (IRI), IEEE, Jul. 30, 2019, pp. 283-290, XP033619124.

Tian Haiman et al., "Genetic Algorithm Based Deep Learning Model Selection for Visual Data Classificalion", 2019 IEEE 20th International Conference on Information Reuse and Integration for Data Science (IRI), IEEE, Jul. 30, 2019, pp. 127-134, XP033619173.

International Search Report and Written Opinion for PCT/EP2020/073727, completed Jan. 1, 2021, 17 pgs.

\* cited by examiner

TRANSFER LEARNING BASED ON CROSS-DOMAIN HOMOPHILY INFLUENCES

TECHNICAL FIELD

The present disclosure relates to machine learning technology, and more particularly to methods, computer program products, and systems for transfer learning based on homophily influences across domains.

BACKGROUND

Machine learning modeling, as part of an artificial intelligence (AI) system, is commonly oriented for a narrow area of interest or an industry. These narrow AI (applied AI, weak AI) systems are built for a particular purpose to performing a specific task in the respective narrow areas of interest/industry. The use of language in describing knowledge in the narrow machine learning model changes over time both in meaning and patterns. On the other hand, broad AI (strong AI, general AI) systems can perform a same type of task across various fields of interests, which would greatly expand the efficiency of the AI system in terms of training efficiency and applicability. As the narrow AI systems do not perform reliably in other areas of interest outside of a domain for which the narrow AI systems are trained, and modeling and training any AI system is highly costly in terms of time and resource, the broad AI systems would significantly improve performance stability and efficiency of the AI systems. However, designing an AI system with flexible applicability is presently in its infancy.

Conventionally, transfer learning is an effort to achieve machine learning in a target task or a target domain by transferring knowledge previously learnt in a source task or a source domain that are distinctive from one of the target task or and target domain. Each domain is defined by a pair of a feature space and a marginal probability distributions of the feature space, respective to the source domain and the target domain. Each task is defined by a pair of a label space and a conditional probability distribution of the label space over a given feature space, respective to the source domain and the target domain. One of common conventional transfer learning scenarios indicates that the feature spaces of the source domain and the target domain can be different as in cases where documents are written in two different languages in a document classification example in the context of natural language processing.

In implementing machine learning models, Artificial Neural Networks (ANNs) that were inspired by information processing and distributed communication nodes in biological systems are often employed. ANNs have various differences from biological brains, however. Specifically, neural networks tend to be static and symbolic, while the biological brain of most living organisms is dynamic, flexible, and analog, and can be easily reprogrammed, with an attribute called "plasticity". Deep learning architectures, implemented with ANNs with many hidden layers, have been applied to fields including computer vision, speech recognition, natural language processing, audio recognition, social network filtering, machine translation, bioinformatics, drug design, medical image analysis, material inspection and board game programs, where they have produced results comparable to and in some cases superior to human experts. Examples of commonly used deep learning architectures include deep neural networks, deep belief networks, recurrent neural networks, deep residual networks, and convolutional neural networks.

SUMMARY

The shortcomings of the prior art are overcome, and additional advantages are provided, through the provision, in one aspect, of a method. The method includes, for instance: generating, by one or more processor, a plurality of deep transfer learning networks based on a plurality of narrow exemplars and a plurality of broad exemplars, where a first subset of the narrow exemplars represents a source domain, a second subset of the narrow exemplars represents a target domain, and the broad exemplars represent both the source domain and the target domain; encoding, by the one or more processor, one or more transfer layers to a chromosome for genetic operators, where the one or more transfer layers are to be transferred from a source deep transfer learning network corresponding to the source domain to a target deep transfer learning network corresponding to the target domain, where the plurality of the deep transfer learning network include both the source deep transfer learning network and the target deep transfer learning network; diversifying, by the one or more processor, concurrently both the source deep transfer learning network and the target deep transfer learning network by use of the genetic operators; and producing, by the one or more processor, the target deep transfer learning network that integrates a result from the diversifying on the source deep transfer learning network and that passes a predefined fitness threshold condition for the target deep transfer learning network.

Additional advantages are provided, through the provision, in one aspect, of a computer program product. The computer program product includes, for instance: a computer readable storage medium readable by one or more processor and storing instructions for execution by the one or more processor for performing a method including: generating a plurality of deep transfer learning networks based on a plurality of narrow exemplars and a plurality of broad exemplars, where a first subset of the narrow exemplars represents a source domain, a second subset of the narrow exemplars represents a target domain, and the broad exemplars represent both the source domain and the target domain; encoding one or more transfer layers to a chromosome for genetic operators, where the one or more transfer layers are to be transferred from a source deep transfer learning network corresponding to the source domain to a target deep transfer learning network corresponding to the target domain, where the plurality of the deep transfer learning network include both the source deep transfer learning network and the target deep transfer learning network; diversifying concurrently both the source deep transfer learning network and the target deep transfer learning network by use of the genetic operators; and producing the target deep transfer learning network that integrates a result from the diversifying on the source deep transfer learning network and that passes a predefined fitness threshold condition for the target deep transfer learning network.

Additional advantages are provided, through the provision, in one aspect, of a system. The system includes, for instance: a memory; one or more processor in communication with memory; and program instructions executable by the one or more processor via the memory to perform a method including: generating a plurality of deep transfer learning networks based on a plurality of narrow exemplars and a plurality of broad exemplars, where a first subset of the narrow exemplars represents a source domain, a second subset of the narrow exemplars represents a target domain, and the broad exemplars represent both the source domain and the target domain; encoding one or more transfer layers to a chromosome for genetic operators, where the one or more transfer layers are to be transferred from a source deep transfer learning network corresponding to the source domain to a target deep transfer learning network corresponding to the target domain, where the plurality of the deep transfer learning network include both the source deep transfer learning network and the target deep transfer learning network; diversifying concurrently both the source deep transfer learning network and the target deep transfer learning network by use of the genetic operators; and producing the target deep transfer learning network that integrates a result from the diversifying on the source deep transfer learning network and that passes a predefined fitness threshold condition for the target deep transfer learning network, where the predefined fitness threshold condition is determined based on the accuracy of the target deep transfer learning network as determined from an average between narrow ground truths specific to the target domain and broad ground truths applicable for both the source domain and the target domain.

Additional advantages are provided, through the provision, in one aspect, of a method. The method includes, for instance: generating, by one or more processor, a plurality of deep transfer learning networks based on a plurality of narrow exemplars and a plurality of broad exemplars, where a first subset of the narrow exemplars represents a source domain, a second subset of the narrow exemplars represents a target domain, and the broad exemplars represent both the source domain and the target domain; training, by the one or more processor, the source deep transfer learning network with the first subset of the narrow exemplars and the broad exemplars; encoding, by the one or more processor, one or more transfer layers to a chromosome for genetic operators, where the one or more transfer layers are to be transferred from a source deep transfer learning network corresponding to the source domain to a target deep transfer learning network corresponding to the target domain, where the plurality of the deep transfer learning network include both the source deep transfer learning network and the target deep transfer learning network; mutating, by the one or more processor, randomly the transfer layers of the source deep transfer learning network from the encoding; and ascertaining, by the one or more processor, that a fitness threshold condition for the source deep transfer learning network is satisfied; migrating, by the one or more processor, weights of respective transfer layers of two or more source deep transfer learning networks over to the target deep transfer learning network respectively.

Additional advantages are provided, through the provision, in one aspect, of a method. The method includes, for instance: generating, by one or more processor, a plurality of deep transfer learning networks based on a plurality of narrow exemplars and a plurality of broad exemplars, where a first subset of the narrow exemplars represents a source domain, a second subset of the narrow exemplars represents a target domain, and the broad exemplars represent both the source domain and the target domain; training, by the one or more processor, the target deep transfer learning network with the second subset of the narrow exemplars and the broad exemplars; encoding, by the one or more processor, one or more transfer layers to a chromosome for genetic operators, where the one or more transfer layers are to be transferred from a source deep transfer learning network corresponding to the source domain to a target deep transfer learning network corresponding to the target domain, where the plurality of the deep transfer learning network include both the source deep transfer learning network and the target deep transfer learning network; ascertaining, by the one or more processor, that respective transfer layers of two source deep transfer learning networks have their respective weights migrated over to the target deep transfer learning network for respectively passing a fitness threshold condition for the source deep transfer learning network; crossing over, by the one or more processor, the transfer layers of the target deep transfer learning network with the transfer layers of the two source deep transfer learning networks from the ascertaining; and producing, by the one or more processor, the target deep transfer learning network that integrates a result from the crossing over on the target deep transfer learning network and that passes a predefined fitness threshold condition for the target deep transfer learning network.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
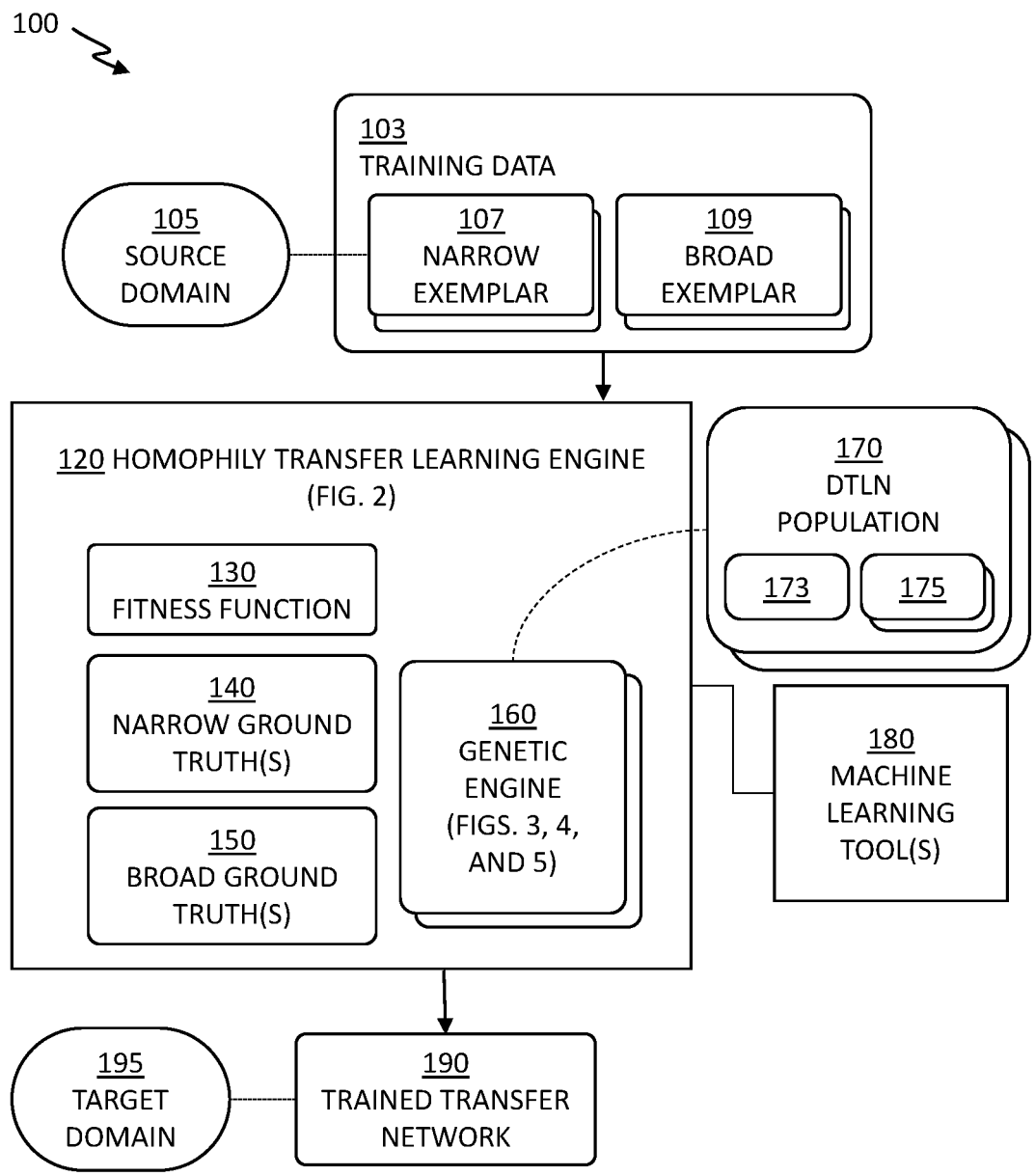
FIG. 1 depicts a system for transfer learning by homophily, in accordance with one or more embodiments set forth herein.

FIG. 1 depicts a system 100 for transfer learning by homophily, in accordance with one or more embodiments set forth herein.

Embodiments of the present invention recognize that machine learning is commonly applicable only in the same task or domain as the training data and that building and training such narrowly applicable machine learning model is extremely expensive in time and resource. Embodiments of the present invention recognize that improvement with machine learning on cross-domain applicability has been attempted in transfer learning, in which a machine learning in a target task/domain is achieved by transferring knowledge previously learnt in a source task/domain. Embodiments of the present invention recognize that the source task/domain is distinctive from the target task/domain but the knowledge on the source task/domain can be generalized into the target task/domain.

The number of machine learning models respective to each narrow area of interest would substantially increase over time, and a group of compatible machine learning models can coevolve by use of transfer learning, by which the body of knowledge from each machine learning model can be cumulated and shared, such that training of the machine learning models can be improved in a manner more efficient than training individual machine learning models for each narrow area of interests.

Transfer learning indicates a type of machine learning where a body of knowledge in a source domain is transferred to another domain that is distinctive from the source domain. Embodiments of the present invention recognize that transfer learning is a type of machine learning that utilizes knowledge transferred from a machine learning model, that is often a neural network of a deep architecture with many hidden layers, of the source task/domain in building a machine learning model for the target task/domain, such that machine learning in the target task/domain can be done more efficiently than performing machine learning from the scratch for the target task/domain.

Embodiments of the present invention recognize that transfer learning would be a way to achieve a broad AI system that can be applicable to certain other areas of interest than the narrow area of interest for which the machine learning model is trained, and, ultimately, a general AI system, in which the machine learning model can apply knowledge obtained from a specific narrow area of interest to all areas of interest, as human beings apply a certain knowledge to any other endeavor regardless of the area of interest from which the knowledge originates. Embodiments of the present invention recognize that transfer learning can improve machine learning of the target task by providing ways to achieve improved initial performance, improved learning curve, and improved final performance than machine learning without the transfer of knowledge.

Embodiments of the present invention recognize that machine learning in a target task or a target domain is achieved by transferring knowledge previously learnt in a source task or a source domain that are distinctive from one of the target task or and target domain in conventional transfer learning, particularly in classification tasks. Embodiments of the present invention recognize that each domain is defined by a pair of a feature space and a marginal probability distributions of the feature space, respective to the source domain and the target domain. Embodiments of the present invention also recognize that each task is defined by a pair of a label space and a conditional probability distribution of the label space over a given feature space, respective to the source domain and the target domain. Embodiments of the present invention also recognize that one of common conventional transfer learning scenarios indicates that the feature spaces of the source domain and the target domain can be different as in cases where documents are written in two different languages in a document classification example in the context of natural language processing. Embodiments of the present invention further recognize that an objective of transfer learning is to enable us to learn the target conditional probability distribution of respective labels in the target labels over each target feature in the target domain with the information gained from the source domain and the source task, without training the target conditional probability distribution with training data of pairs of target features and target labels corresponding to the target feature.

Consistently with common usage of the term transfer learning, in this specification, terms "transfer layer", "contribution layer", and "rolling layer" interchangeably indicate a body of knowledge that is being transferred from the source task/domain to the target task/domain, as being represented as a weight vector of a layer of a deep learning neural network for the source task/domain, in which a plurality of layers can contribute to transfer learning of another deep learning neural network for the target task/domain. The weight vector represents a series of weights for all nodes in the layer of the neural network. Conventionally transfer learning is performed on learning networks of the same topology, where the learning networks have the same number of nodes respectively connected in the same manner to a next layer of nodes.

Further in this specification, term "homophily" indicates a tendency of an ANN as a machine learning model to develop features appearing in other ANNs that are similar to the ANN, rather than another ANNs that are dissimilar to the ANN. In this specification, term "homophily influence" indicates influences from the other similar ANN that induces the homophily on the ANN. Accordingly, in this specification, a machine learning model (ANN) of the source task/domain exerts homophily influences on the target task/domain, and a machine learning model (ANN) of the target task/domain demonstrates a certain degree of homophily influence by the machine learning model of the source task/domain, in manners consistent with embodiments of the present invention as presented herein. In this specification, term task, as used in "source task" and "target task", indicates an objective to achieve by use of machine learning, and similarly, term domain, as used in "source task" and "target task", is an identifiable field of application in which the task is performed and/or from which training data for the machine learning model for the task originate. Examples of tasks in the context of machine learning include, but are not limited to, labeling/classification on unstructured data, speech recognition/automated response in the context of natural language processing, etc. In this specification, an instance of ANN of a predefined deep architecture with many hidden layers subject to transfer learning as performed by the homophily transfer learning engine 120 is referred to as a deep transfer learning network (DTLN).

The system 100 includes training data 103 for a source domain 105, a homophily transfer learning engine 120, one or more machine learning tool 180, and a trained transfer network 190 for a target domain 195. The training data 103 are inputs to the homophily transfer learning engine 120 and the trained transfer network 190 is an output of the homophily transfer learning engine 120. The one or more machine learning tool 180 is operatively coupled to the homophily transfer learning engine 120 and provides functionalities for conventional machine learning framework such as various machine learning modeling, training, predictive modeling, and deep learning.

The training data 103 include a plurality of narrow exemplars 107 applicable to respective domains, including the source domain 105 and the target domain 195, and a plurality of broad exemplars 109 applicable to both the source domain 105 and the target domain 195. Embodiments of the present invention recognize that "exemplar" indicates a data point that is representative of a group of data points, which is a subset of the training data 103. In this specification, other data points of the training data 103 are deemed as being represented by the narrow exemplars 107 for the source domain 105, the narrow exemplars 107 for the target domain 195, or the broad exemplars 109. The training data 103 can further include other narrow exemplars 107 that correspond to a third domain distinctive from the source domain 105 and the target domain 195.

The narrow exemplars 107 of the training data 103 include a various distinctive sets of narrow exemplars, a set of which is applicable to and/or collected from the source domain 105 and another set of which is applicable to and/or collected from the target domain 195. The narrow exemplars 107 of the training data 103 can further include any other sets of exemplars that are respectively applicable to and/or collected from a certain domain relevant to either the source domain 105 or the target domain 195 that is distinctive from both the source domain 105 and the target domain 195.

The homophily transfer learning engine 120 generates the trained transfer network 190 for the target domain 195 based on the inputs of the training data 103. The homophily transfer learning engine 120 includes a fitness function 130, a plurality of narrow ground truths 140, a plurality of broad ground truths 150, and a plurality of genetic engines 160. The homophily transfer learning engine 120 generates and concurrently manipulates a plurality of deep transfer learning networks (DTLNs) from the population of the DTLNs 170 by use of a type of genetic engine 160 corresponding to a type of DTLN 170. In this specification, the DTLNs, the population of the DTLNs 170, and the population, can be used interchangeably to indicate the pool of DTLNs subject to operations of the homophily transfer learning engine 120 and one or more threads of genetic engines 160 of predefined types corresponding to respective types of the DTLNs.

The DTLNs from the population of the DTLNs 170, or simply, the DTLNs 170, collectively indicate respective machine learning network for the transfer learning based on homophily that are consistent with the embodiments of the present invention. The DTLNs 170 are in a form of an ANN of deep architecture with multiple hidden layers, as noted above. Amongst the population of the DTLNs 170, a central DTLN 173 and two or more non-central DTLNs 175 are present. The homophily transfer learning engine 120 can concurrently operate multiple threads respective to each of the plurality of genetic engines 160 runs on respectively corresponding instances of the DTLNs from the population of the DTLNs 170. Details on operations of the homophily transfer learning engine 120 are presented in FIGS. 2, 3, and 4, and respectively corresponding descriptions.

In certain embodiments of the present invention, the genetic engine 160 of the homophily transfer learning engine 120 is of two types, a genetic engine to process a non-central DTLN 175 and a genetic engine to process a central DTLN 173. In the same embodiment of the present invention, the homophily transfer learning engine 120 runs a single thread of the genetic engine for the central DTLN 173 from the population of DTLNs 170 while running a plurality of threads of the genetic engine corresponding to the number of the non-central DTLNs 175 from the rest of population of DTLNs 170.

All threads of the genetic engine 160 for non-central DTLNs 175 respectively communicate with the thread of the genetic engine for the central DTLN 173 by accessing the central DTLN 173, for measurement of homophily influence on all non-central DTLNs 175 as well as for migrating weight vectors of the non-central DTLNs 175 to the central DTLN 173.

The non-central DTLNs 175 are generally of two categories of showing strong homophily to the central DTLN 173 and of showing weak to no homophily, which is referred to as inverse homophily, to the central DTLN 173. As previously indicated, the term "homophily" indicates a tendency of ANNs, that is, instances of the DTLNs from the population of the DTLNs 170, developing features appearing in the central DTLN 173 when any non-central DTLN 175 is similar to the central DTLN 173. Accordingly, the homophily transfer learning engine 120 determines the level of homophilous influence of the central DTLN 173 on each of non-central DTLNs 175 based on how similar a presently compared non-central DTLN 175 is to the central DTLN 173.

The fitness function 130 quantifies how well a subject DTLN from the DTLNs 170 fit a purpose for the subject DTLN as applied to a chromosome, which is a string of numbers encoding the subject DTLN. In certain embodiments of the present invention, the fitness function 130 can be oriented toward the performance of the subject DTLN in the target domain 195 for a target task identical to the source task for which the narrow exemplars of the source domain 105 has been collected. In certain embodiments of the present invention, the fitness function 130 can be oriented toward the accuracy of the subject DTLN in the target domain 195 based on the narrow exemplars for the target domain 195.

In certain embodiments of the present invention, the fitness function 130 includes a transfer layer as a parameter such that the fitness function 130 coevolves with a series of transfer layers over time as the homophily transfer learning engine 120 operates on the population of the DTLNs 170. By including the transfer layer parameter in the fitness function 130, the homophily transfer learning engine 120 can determine whether or not optimal amount of homophily influences is trained into each DTLN in the population of the DTLNs 170. In the same embodiment of the present invention, the genetic engine threads of the homophily transfer learning engine 102 evaluates respective subject DTLN at the completion of each epoch during the training.

An epoch indicates that all of training data 103 has passed the subject DTLN 170 once, after a plurality of iterations on respective data batches. Embodiments of the present invention recognize that the body of the training data 103 would be too large for passing through the subject DTLN 170, so the body of the training data 103 would be divided into a certain number of batches of a smaller number of instances from the training data 103, which is often referred to as a batch size. One iteration indicates training of a single batch, and when all batches in the training data 103 had been trained, the homophily transfer learning engine 120 completes one epoch, when the fitness evaluation is performed. Accordingly, the total number of iterations in one epoch is equal to the total number of data instances in the training data 103 divided by the batch size.

In certain embodiments of the present invention, the fitness function 130 can be differentiated between the genetic engine 160 for central DTLN and the genetic engine 160 for non-central DTLN, provided that evaluation is performed against respective results from the same body of training data 103. Conversely, in the same embodiments of the present invention as above, the fitness function 130 can be the same for the genetic engine 160 for central DTLN and the genetic engine 160 for non-central DTLN, where the training data 103 for the respective subject DTLNs had been differentiated. Also within the same instance of the genetic engine 160, the fitness function 130 can be consistent when to test a fixed set of training data 103, or can be mutable over time for coevolution of the narrow exemplars for the source domain and the narrow exemplars for the target domain. Computational complexity of the fitness function 130 is on the low end in comparison to typical genetic algorithms in order to increase performance of the homophily transfer learning engine 120 with evaluation, as the genetic engines 160 needs to run numerous times to produce the trained transfer network 190 that is usable for any non-trivial task in the target domain 195. Along with the fitness function 130, a predefined threshold for the fitness level can be set to determine whether or not the evaluated DTLN is satisfactory in performance, accuracy, or other objective that is being evaluated.

In certain embodiments of the present invention, the accuracy fitness function 130 is defined as an average between the narrow ground truths 140 specific to the target domain 195 and the broad ground truths 150 applicable for both the source domain 105 and the target domain 195.

The plurality of narrow ground truths 140 indicate examples observed from respective domains including the source domain 105 and the target domain 195. Typically the term "ground truth" indicates an observed instance from the training data 103 with respect to a particular category. In certain embodiment of the present invention, the narrow ground truths 140 can be the same as a set of the narrow exemplars 107 that are applicable for the same domain. The plurality of narrow ground truths 140 include narrow ground truths for the source domain 105 and narrow ground truths for the target domain 195. The plurality of narrow ground truths 140 can further include narrow ground truths for another domain that has a certain level of similarity with the target domain 195. When a feature space of a domain is similar to the feature space of the target domain 195, the narrow ground truths of the domain would more closely resemble the narrow ground truths for the target domain 195 as being more subject to homophily influence. Similarly, the plurality of broad ground truths 150 indicate examples observed in both the source domain 105 and the target domain 195.

In certain embodiments of the present invention, the homophily transfer learning engine 120 generates at least three (3) instances of the DTLNs 170 including a DTLN that is most similar to the source domain, which is referred to as a homophilous DTLN, another DTLN that is most dissimilar to the source domain, which is referred to as an inverse homophilous DTLN, both DTLNs are referred to as the non-central DTLN 175. Still another DTLN referred to the central DTLN 173 would be developed into the trained transfer network 190 for the target domain 195 by transferring weights from transfer layers of both of the non-central DTLNs 175 of the homophilous DTLN and the inverse homophilous DTLN. The homophily transfer learning engine 120 produces the central DTLN 173 for the target domain as the trained transfer network 190 for the target domain 195, according to operations by the threads of the genetic engine 170. A plurality of threads of the genetic engine 170, varying on a type of the genetic engine 170, run concurrently respective to each of the DTLN 160, as represented by a dashed coupling between the DTLN 160 and the genetic engine 170 in FIG. 1.

In certain embodiments of the present invention, the plurality of genetic engines 160 of the homophily transfer learning engine 120 include a non-central thread genetic engine, which operates on one of the non-central DTLNs 175, and a central thread genetic engine, which operates on the central DTLN 173. In the same embodiments, the homophily transfer learning engine 120 concurrently runs multiple instances of the non-central thread genetic engine and a single instance of the central thread genetic engine at one time.

Each of the genetic engine 170 implements a heuristic process that mimics the process of natural evolution on the subject DTLN encoded as a respective chromosome, to generate useful solutions to optimization and search problems, by use of techniques including, but not limited to, inheritance, mutation, selection, and crossover, which are mechanisms of natural evolution.

Each thread of the genetic engine 160 of the homophily transfer learning engine 120 runs a distinctive subset of the narrow exemplars 107 through a certain corresponding DTLN of the plurality of DTLNs 170 and evaluates each of the distinctive subsets of the narrow exemplars 107 with the narrow ground truth 140 within the fitness function 130. Similarly, the same thread of the genetic engine 160 concurrently runs all data points of the broad exemplars 109 through the same DTLN of the plurality of DTLNs 170 and evaluates the instances of the broad exemplars 109 with the broad ground truth 150 within the fitness function 130. Details on operations of the genetic engine 160 for non-central DTLN 175 are presented in FIGS. 2 and 3, and respectively corresponding descriptions. Details on operations of the genetic engine 160 for central DTLN 173 are presented in FIGS. 2 and 4 and respectively corresponding descriptions.

Figure 2:
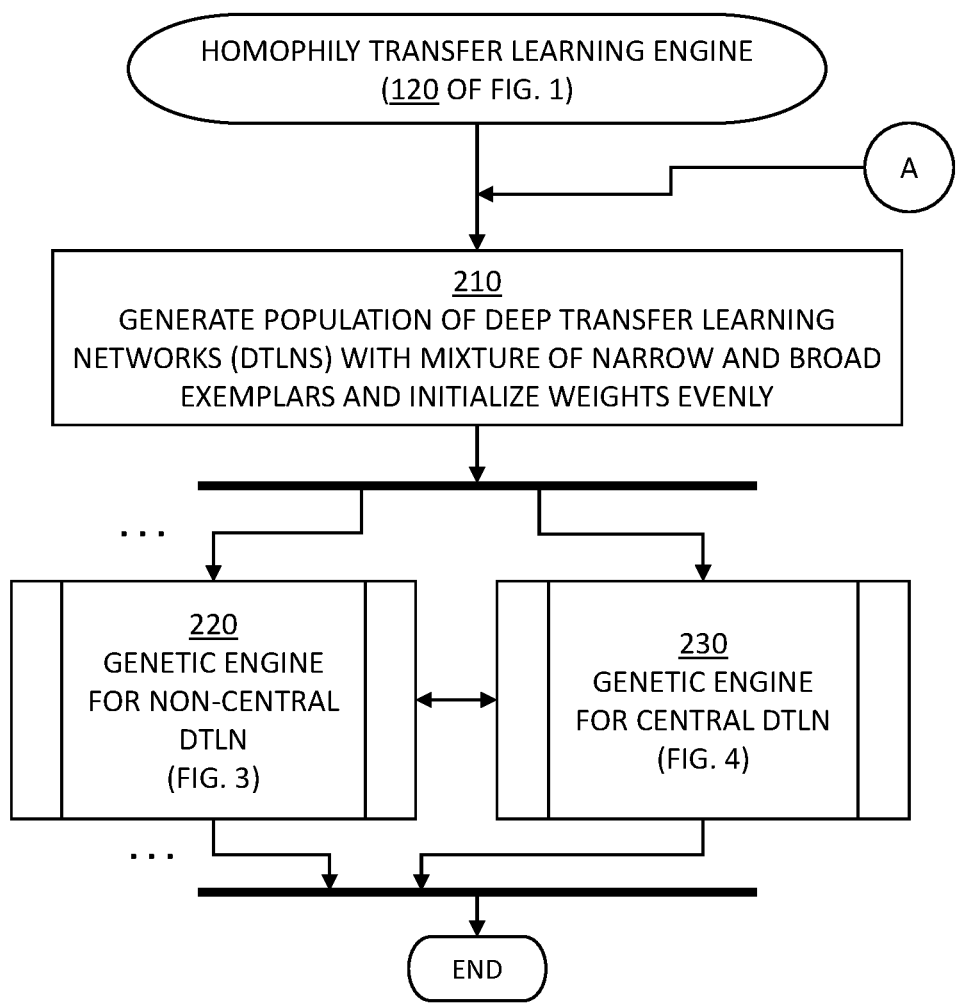
FIG. 2 depicts a flowchart of operations performed by the homophily transfer learning engine, in accordance with one or more embodiments set forth herein.

FIG. 2 depicts a flowchart of operations performed by the homophily transfer learning engine, in accordance with one or more embodiments set forth herein.

In block 210, the homophily transfer learning engine 120 generates a population of the deep transfer learning networks (DTLNs) 170 based on the training data 103 with mixture of the narrow exemplars 107 and the broad exemplars 109. The homophily transfer learning engine 120 subsequently initializes weights on all layers of each DTLN in the population of DTLNs 170 evenly. Then the homophily transfer learning engine 120 proceeds with parallelly processing a plurality of threads respective to a genetic engine for non-central DTLN in block 220 and a thread for a genetic engine for central DTLN in block 230.

As noted above, the population of the DTLNs 170 are respective instance of neural network of a deep architecture. In certain embodiments of the present invention, all DTLNs 170 subject to operations of the homophily transfer learning engine 120 are of the same topology, indicating the same number of nodes in each layer of the DTLNs, having the same connection to the respective next layers in each DTLN. The term "topology" typically indicates the way nodes of a neural network are connected.

In the same embodiments of the present invention as above, an activation function of each node in the respective DTLNs 170 defines the output of the respective node based on the input(s) to the node. Within the activation function, a certain input can be biased toward the output in comparison to other entry of the input. Such bias, or ratio of contribution toward the output of the input is referred to as weights parameterized within the activation function for respective inputs. A transfer layer is represented as a weight vector for the layer, provided that the activation function is uniform for all nodes in the subject DTLN 170. The activation function for nodes in the DTLN 170 is typically a nonlinear function to facilitate the DTLN 170 to perform nontrivial task without using massive number of nodes. Typically in the context of the ANN, the activation function can also be referred to as a transfer function, which transfers inputs to outputs. In this specification, however, as the term transfer layers indicates a plurality of layers where weight vectors are transferred from one DTLN to another DTLN, the activation function for each node would be referred as the activation function.

In certain embodiments of the present invention, the homophily transfer learning engine 120 initializes the weights on respective layers of the population of the DTLNs 170 evenly. The respective weights can be later updated by use of batch backpropagation as the weights of the respective DTLNs 170 evolves during respective training.

In the same embodiments of the present invention, the respective instances of the DTLNs 170 can also have hyper-parameters other than the weights. Examples of hyper-parameters include, but are not limited to, a type of the architecture, respective type of each edge where edges are not uniform according to the type of the architecture, a number of neurons, a number of layers, a learning rate eta ($\eta$), a regularization penalty lambda ($\lambda$), momentum, a number of epochs, batch size, dropout, and any other attribute of the DTLN as a whole.

In certain embodiments of the present invention, the population of the DTLNs 170 generated in block 210 includes a central DTLN and two (2) or more non-central DTLNs. In the same embodiment, the homophily transfer learning engine 120 runs a single instance of the genetic engine for central DTLN corresponding to the central DTLN In block 220, the homophily transfer learning engine 120 performs a thread of genetic engine for an instance of non-central DTLN 160. As noted, the homophily transfer learning engine 120 parallelly runs a plurality of threads of the genetic engine for non-central DTLN, respective each of the non-central DTLNs 175 that is currently in training, as well as a thread of the genetic engine for the central DTLN 173. Each thread of genetic engine training the non-central DTLN 173 can contribute to the central DTLN 173 upon passing the fitness threshold, as described in FIG. 3 and corresponding description. Each thread of the genetic engine for the non-central DTLN 175 interacts with the thread of the genetic engine for the central DTLN 173, as represented by a bidirectional arrow between block 220 and block 230. Then, the homophily transfer learning engine 120 terminates processing the subject non-central DTLN 175.

In block 230, the homophily transfer learning engine 120 performs a thread of genetic engine for an instance of central DTLN 160. As noted, the homophily transfer learning engine 120 parallelly runs the thread of the genetic engine for the central DTLN 173 in block 230 and the plurality of threads of the genetic engine 160 training the respective non-central DTLNs 175. Then, the homophily transfer learning engine 120 terminates processing the subject non-central DTLN 175.

Figure 4:
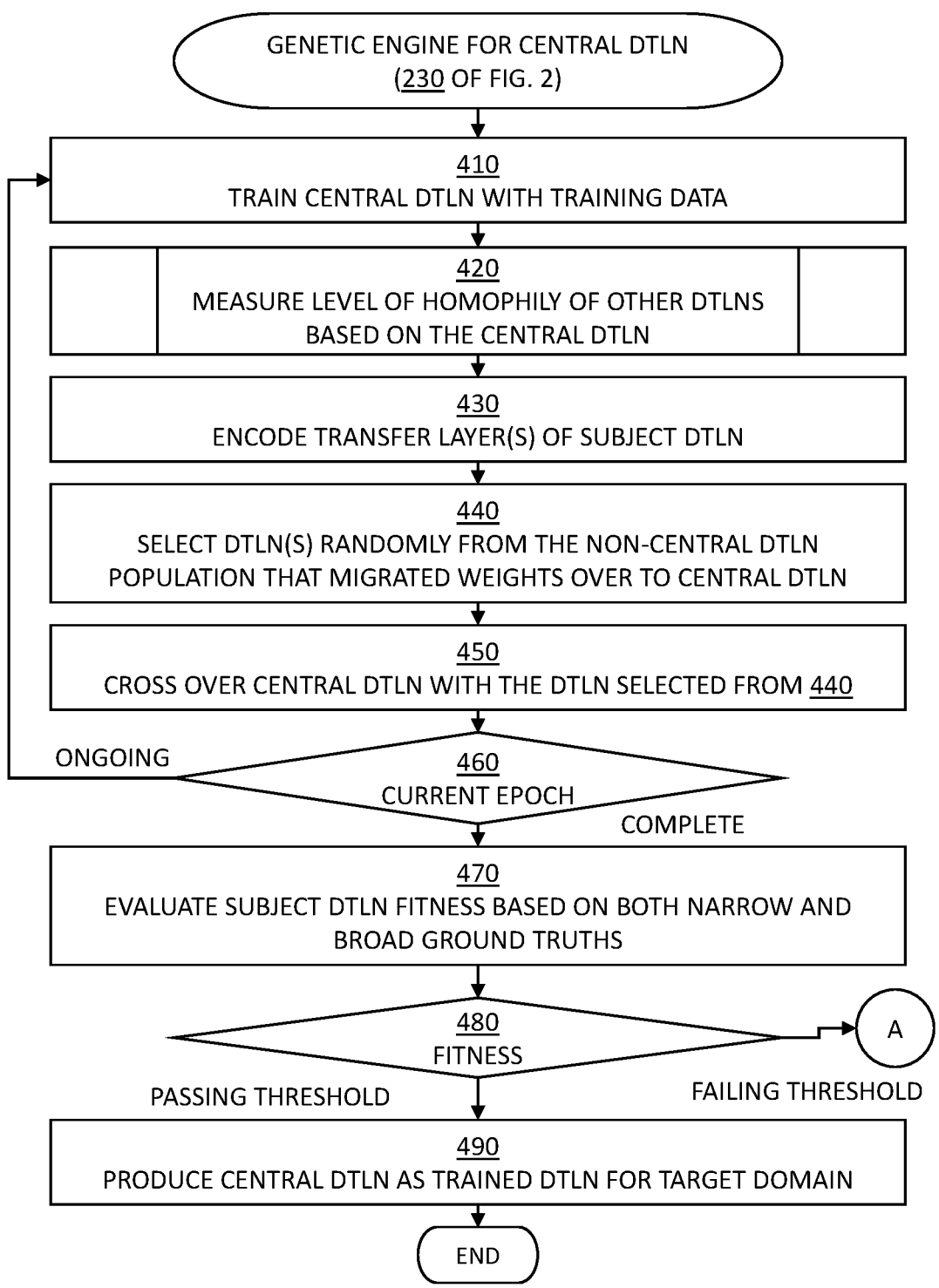
FIG. 4 depicts a flowchart of operations performed by the genetic engine for the central DTLN in block 230 of FIG. 2, in accordance with one or more embodiments set forth herein.

In certain embodiments of the present invention, the thread of genetic engine training the central DTLN 173 integrates repeatedly the non-central DTLNs 175 that had passed the fitness threshold in developing the trained transfer network 195 for the target domain 195, as described in FIG. 4 and corresponding description. As noted, the thread of the genetic engine for the central DTLN 173 communicates with each thread of the genetic engine for the non-central DTLN 175 as represented by a bidirectional arrow between block 220 and block 230.

Figure 3:
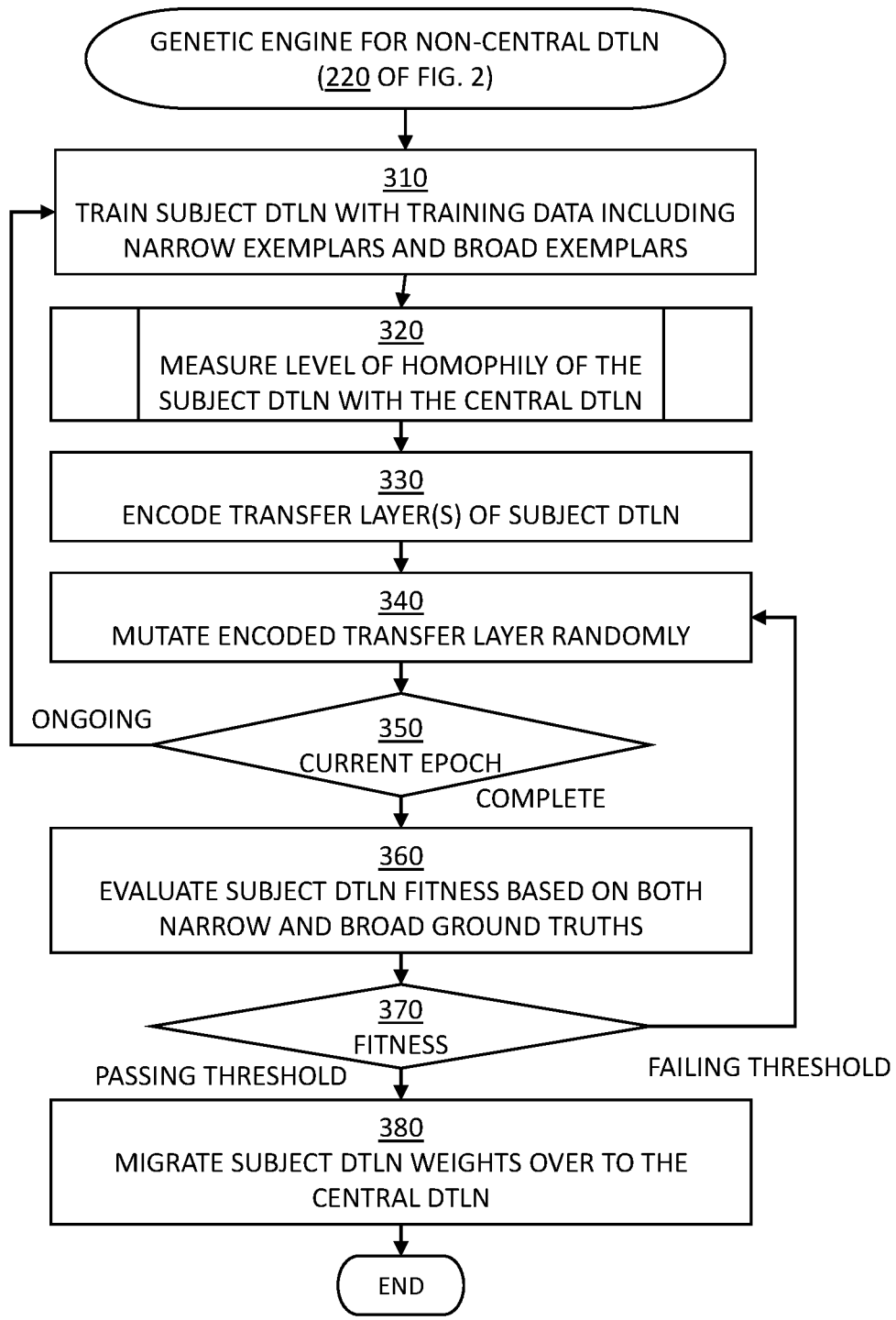
FIG. 3 depicts a flowchart of operations performed by the genetic engine for each of non-central DTLNs in block 220 of FIG. 2, in accordance with one or more embodiments set forth herein.

FIG. 3 depicts a flowchart of operations performed by the genetic engine for each of non-central DTLNs 175 in block 220 of FIG. 2, in accordance with one or more embodiments set forth herein.

In block 310, the homophily transfer learning engine 120 trains a subject non-central DTLN 175 with the training data 103 including a unique combination of the narrow exemplars 107 and the broad exemplars 109. Then, the homophily transfer learning engine 120 proceeds with block 320.

In certain embodiments of the present invention, the total threads of the genetic engines training each non-central DTLNs 175 collectively covers all narrow exemplars 107 of the training data 103 such that all narrow exemplars 107 respective to each domain represented in the training data 103 can be trained into one or more non-central DTLN 175.

In certain embodiments of the present invention, the training data 103 have too many instances for training the subject non-central DTLN 175 all at once. In such cases, the homophily transfer learning engine 120 trains a first batch of the training data 103, of a size that can be trained at once and proceeds with block 320.

In block 320, the homophily transfer learning engine 120 measures a level of homophily of the subject non-central DTLN 175 trained in block 310 to the central DTLN 173. The non-central DTLN 175 can be homophilous to the central DTLN 173 or inverse homophilous, that is, dissimilar, to the central DTLN 173. Then, the homophily transfer learning engine 120 proceeds with block 330.

In certain embodiments of the present invention, the homophily transfer learning engine 120 measures the level of homophilous influence or homophily, as a range $[0, \pi]$ of similarity values between two DTLNs, as comparing respective weights of the subject non-central DTLN 175 and the central DTLN 173, per corresponding layers.

In block 330, the homophily transfer learning engine 120 encodes a predefined number of transfer layers of the subject non-central DTLN into a string of numbers referred to as a chromosome for further genetic processing. Then, the homophily transfer learning engine 120 proceeds with block 340.

In block 340, the homophily transfer learning engine 120 mutates the transfer layer(s) encoded in block 330 randomly in order to diversify the encoded transfer layers. Then, the homophily transfer learning engine 120 proceeds with block 350.

The principles of the genetic processing is to find an optimal solution by repeating the process of searching through diversified solutions, discarding less desirable solutions, and further diversifying the solutions that are desirable, until a solution that meets a threshold condition is found, as in genetic evolution in nature. the In certain embodiments of the present invention, the homophily transfer learning engine 120 employs a random-single point mutation in which an arbitrary bit in the encoded transfer layer chromosome is changed from the original bit. In other embodiments of the present invention, the homophily transfer learning engine 120 can employ swaps, inversions, and/or scrambles. By mutating the population, the homophily transfer learning engine 120 avoids the transfer layers becoming local minima that often result from too similar networks.

In block 350, the homophily transfer learning engine 120 determines whether or not a current epoch is complete, that is, the subject non-central DTLN 175 is trained with all of the training data 103. If the homophily transfer learning engine 120 determines that the current epoch is ongoing, as there are instance of the training data 103 that had not been applied to the subject non-central DTLN 175, then the homophily transfer learning engine 120 loops back to block 310 to train the subject non-central DTLN with a next batch of the training data 103. If the homophily transfer learning engine 120 determines that the current epoch is complete, as all instance of the training data 103 had been applied to the subject non-central DTLN 175, then the homophily transfer learning engine 120 proceeds with block 360.

In block 360, the homophily transfer learning engine 120 evaluates fitness of the subject non-central DTLN 175 based on both the narrow ground truths 140 the broad ground truths 150. Then, the homophily transfer learning engine 120 proceeds with block 370.

In certain embodiments of the present invention, the fitness function evaluates the accuracy of the subject non-central DTLN 175, by averaging between the values between the narrow ground truths 140 and the broad ground truths 150.

In certain embodiments of the present invention, the fitness function can be oriented toward the performance of the subject non-central DTLN 175. As noted, the fitness function includes a transfer layer as a parameter such that the fitness function 130 coevolves with a series of transfer layers over time as the homophily transfer learning engine 120 operates on the population of the DTLNs 170.

In block 370, the homophily transfer learning engine 120 determines whether or not the fitness value from block 360 passes the condition set with a predefined threshold. If the homophily transfer learning engine 120 determines that the fitness of the subject non-central DTLN 175 passes the predefined threshold condition, then the homophily transfer learning engine 120 proceeds with block 380. If the homophily transfer learning engine 120 determines that the fitness of the subject non-central DTLN 175 fails the predefined threshold condition, then the homophily transfer learning engine 120 loops back to block 340.

In block 380, the homophily transfer learning engine 120 migrates the weight vectors of the transfer layers in the subject non-central DTLN 175 over to the central DTLN 173. The subject non-central DTLN 175 has the accuracy fitness evaluated as passing the threshold from block 370. Then, the homophily transfer learning engine 120 terminates the thread of the genetic engine for non-central DTLN in block 220.

In certain embodiments of the present invention, the migration parameters are preselected and interactively altered with reinforcement learning interface. Initially, the migration can make ten percent (10%) or more of overall weight values. As noted, all DTLNs 170 in the population have the same topology, and the migration would be as updating weights on corresponding transfer layers of two DTLNs selected for migration.

In certain embodiments of the present invention, the weights of the transfer layers are updated by use of batch backpropagation for the narrow exemplars and the broad exemplars separately. In batch backpropagation, all weight changes are summed over a full presentation of all training data 103, and accordingly, the weight updates occur once per epoch.

FIG. 4 depicts a flowchart of operations performed by the genetic engine for the central DTLN 173 in block 230 of FIG. 2, in accordance with one or more embodiments set forth herein.

In block 410, the homophily transfer learning engine 120 trains the central DTLN 173 with the training data 103 including a unique combination of the narrow exemplars 107 and the broad exemplars 109. Then, the homophily transfer learning engine 120 proceeds with block 420.

In certain embodiments of the present invention, the homophily transfer learning engine 120 initially selects the central DTLN 173 at random from the population of the DTLNs 170.

In certain embodiments of the present invention, the training data 103 have too many instances for training the subject central DTLN 173 all at once. In such cases, the homophily transfer learning engine 120 trains only a first batch of the training data 103, of a size that can be trained at once and proceeds with block 420.

In certain embodiments of the present invention, the homophily transfer learning engine 120 stores the original weights of the DTLNs 170 after training for the cases where another central DTLN selects the current central DTLN 173 as a source domain for transfer learning.

In block 420, the homophily transfer learning engine 120 measures a level of homophily of other non-central DTLNs 175 from other threads of the genetic engine to the central DTLN 173 trained in block 410. The non-central DTLNs 175 corresponding to other threads of the genetic engine can be homophilous to the central DTLN 173 or inverse homophilous, that is, dissimilar, to the central DTLN 173. Then, the homophily transfer learning engine 120 proceeds with block 430.

In block 430, the homophily transfer learning engine 120 encodes a predefined number of transfer layers of the central DTLN 173 into a string of numbers referred to as a chromosome for further genetic processing. Then, the homophily transfer learning engine 120 proceeds with block 440.

In block 440, the homophily transfer learning engine 120 selects a pair of DTLNs randomly from the population of the DTLNs 170 that had migrated weights over to the central DTLN 173. Then, the homophily transfer learning engine 120 proceeds with block 450.

As the two DTLNs are randomly selected, homophilous DTLNs and inverse homophilous, or dissimilar, DTLNs are to be equally represented in the selection.

In block 450, the homophily transfer learning engine 120 crosses over the central DTLN 173 with the pair of DTLNs that had been selected from block 440. Then, the homophily transfer learning engine 120 proceeds with block 450.

In certain embodiments of the present invention, the homophily transfer learning engine 120 employs two-point crossover, in which the transfer layers encoded into respective chromosomes would be crossed over at two points. Crossover is one of basic operators in genetic processing, where the genetic sequence is diversified and recombined in searching for an optimal solution. In two-point crossover, the homophily transfer learning engine 120 copies one of the two non-central DTLNs 175 that had been selected from block 440 from the beginning to a first crossover point of the encoded transfer layer of the central DTLN 173. Between the first crossover point to a second crossover point of the encoded transfer layer of the central DTLN 173, the homophily transfer learning engine 120 copies the other of the two non-central DTLNs that had been selected from block 440 to the central DTLN 173. From the second crossover point to the end of the central DTLN 173, the homophily transfer learning engine 120 copies the first one of the two non-central DTLNs that had been selected from block 440 to the central DTLN 173.

In certain embodiments of the present invention, the homophily transfer learning engine 120 can further mutate the crossed over transfer layers such that the central DTLN 173 can be more diversified than without the mutation, and accordingly, would lead to a discovery of an optimal solution for the transfer layers.

In block 460, the homophily transfer learning engine 120 determines whether or not a current epoch is complete, that is, the central DTLN 173 is trained with all of the training data 103. If the homophily transfer learning engine 120 determines that the current epoch is ongoing, as there are instance of the training data 103 that had not been applied to the central DTLN 173, then the homophily transfer learning engine 120 loops back to block 410 to train the central DTLN 173 with a next batch of the training data 103. If the homophily transfer learning engine 120 determines that the current epoch is complete, as all instance of the training data 103 had been applied to the central DTLN 173, then the homophily transfer learning engine 120 proceeds with block 470.

In block 470, the homophily transfer learning engine 120 evaluates fitness of the central DTLN 173 based on both the narrow ground truths 140 the broad ground truths 150. Then, the homophily transfer learning engine 120 proceeds with block 480.

In certain embodiments of the present invention, the fitness function evaluates the accuracy of the central DTLN 173, by averaging between the values between the narrow ground truths 140 and the broad ground truths 150.

In certain embodiments of the present invention, the fitness function can be oriented toward the performance of the central DTLN 173. As noted, the fitness function includes each transfer layer as a parameter such that the fitness function 130 coevolves with a series of transfer layers over time as the homophily transfer learning engine 120 operates on the population of the DTLNs 170.

In certain embodiments of the present invention, the fitness function applied for the central DTLN 173 can be distinctive from the fitness function for non-central DTLNs 175, provided that the combination of the narrow exemplars and the broad exemplars that had been used for training the two DTLNs are the same. Conversely, in the same embodiments of the present invention as above, the same fitness function can be applied for the central DTLN 173 and the non-central DTLN 175, where the training data 103 for the respective DTLNs had been differentiated.

In block 480, the homophily transfer learning engine 120 determines whether or not the fitness value from block 470 passes the condition set with a predefined threshold. If the homophily transfer learning engine 120 determines that the fitness of the central DTLN 173 passes the predefined threshold condition, then the homophily transfer learning engine 120 proceeds with block 490. If the homophily transfer learning engine 120 determines that the fitness of the central DTLN 173 fails the predefined threshold condition, then the homophily transfer learning engine 120 loops back to block 210 of FIG. 2 to generate a new population of DTLNs 170.

In block 490, the homophily transfer learning engine 120 produces the central DTLN 173 as the trained transfer network 190 for the target domain 195. Then, the homophily transfer learning engine 120 terminates the thread of the genetic engine for central DTLN in block 230.

Certain embodiments of the present invention improves efficiency in time and resources for developing a broad artificial intelligence (AI) system by transferring knowledge from a source domain to a target domain based on homophily influence. Certain embodiments of the present invention employs two distinctive types of genetic engines in training and developing optimal population of DTLNs based on the characteristics of a subject DTLN. Certain embodiments of the present invention transforms the subject DTLN based on genetic operators including, but not limited to, crossover and mutation of the transfer layers. Certain embodiments of the present invention migrates weights of the transfer layers from one or more DTLNs having homophilous influence to a target DTLN. Certain embodiments of the present invention migrates weights of the transfer layers from one or more DTLNs having inverse homophilous influence to the target DTLN. Certain embodiments of the present invention accommodates encapsulation of the transfer layers within a new source DTLN such that the transfer of knowledge can be repeated to any depth respective to other target domains. Certain embodiments of the present invention coevolves changes over time in both the source domain and the target domain by employing a fitness function that parametrizes transfer layers. Certain embodiments of the present invention are directly applicable to existing AI system APIs platform across multiple domains. Certain embodiments of the present invention significantly reduces time and resources necessary for training a new AI system for other domain that is homophilous to other preexisting narrow AI systems by transferring the knowledge from the preexisting AI systems and by broadening the applicability of the new AI system in the process. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. Services offering certain embodiments of the present invention can be provided for subscribed business entities/vendors of software applications in need from any location in the world over network communication.

Figure 5:
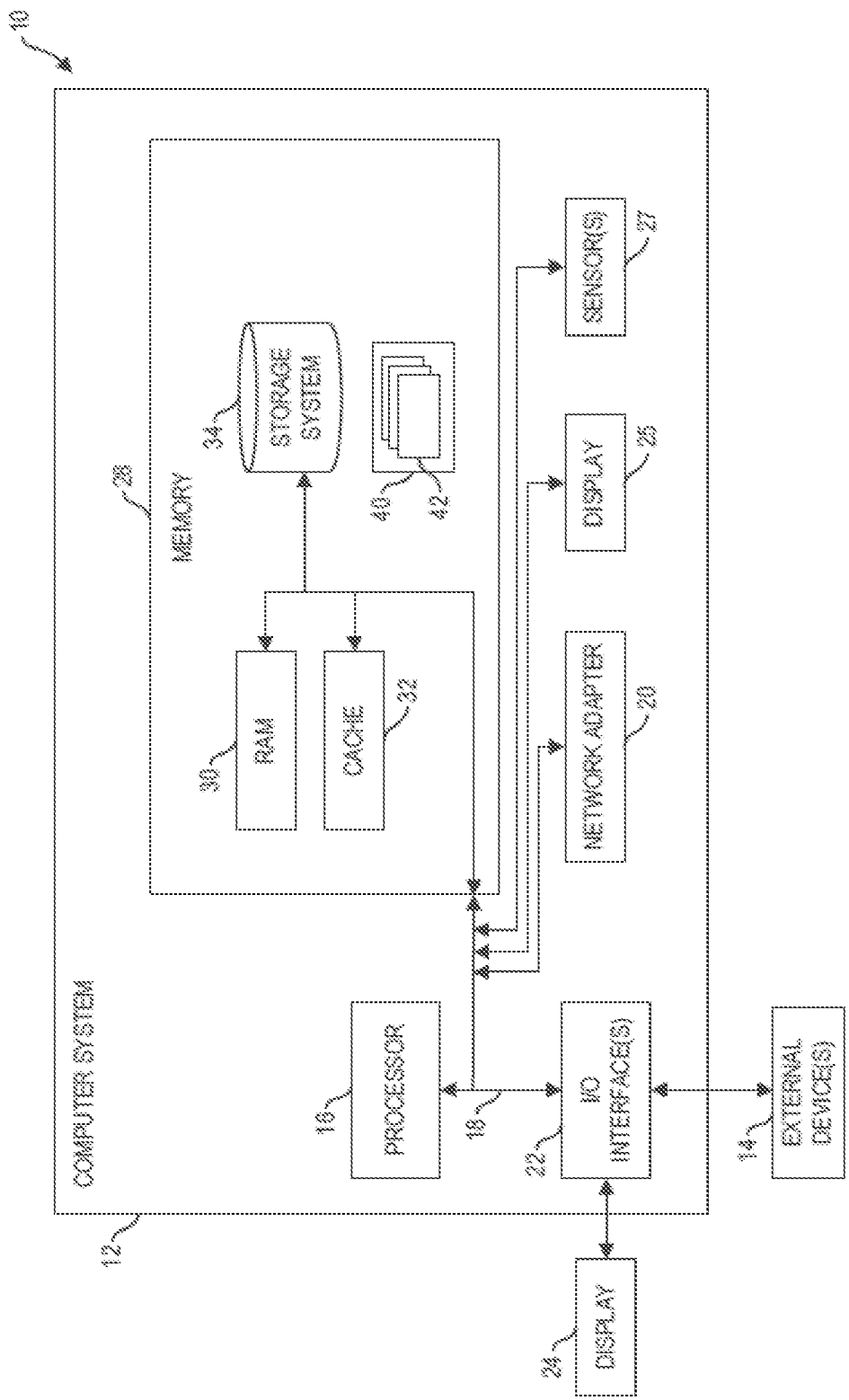
FIG. 5 depicts a cloud computing node according to an embodiment of the present invention.
Figure 6:
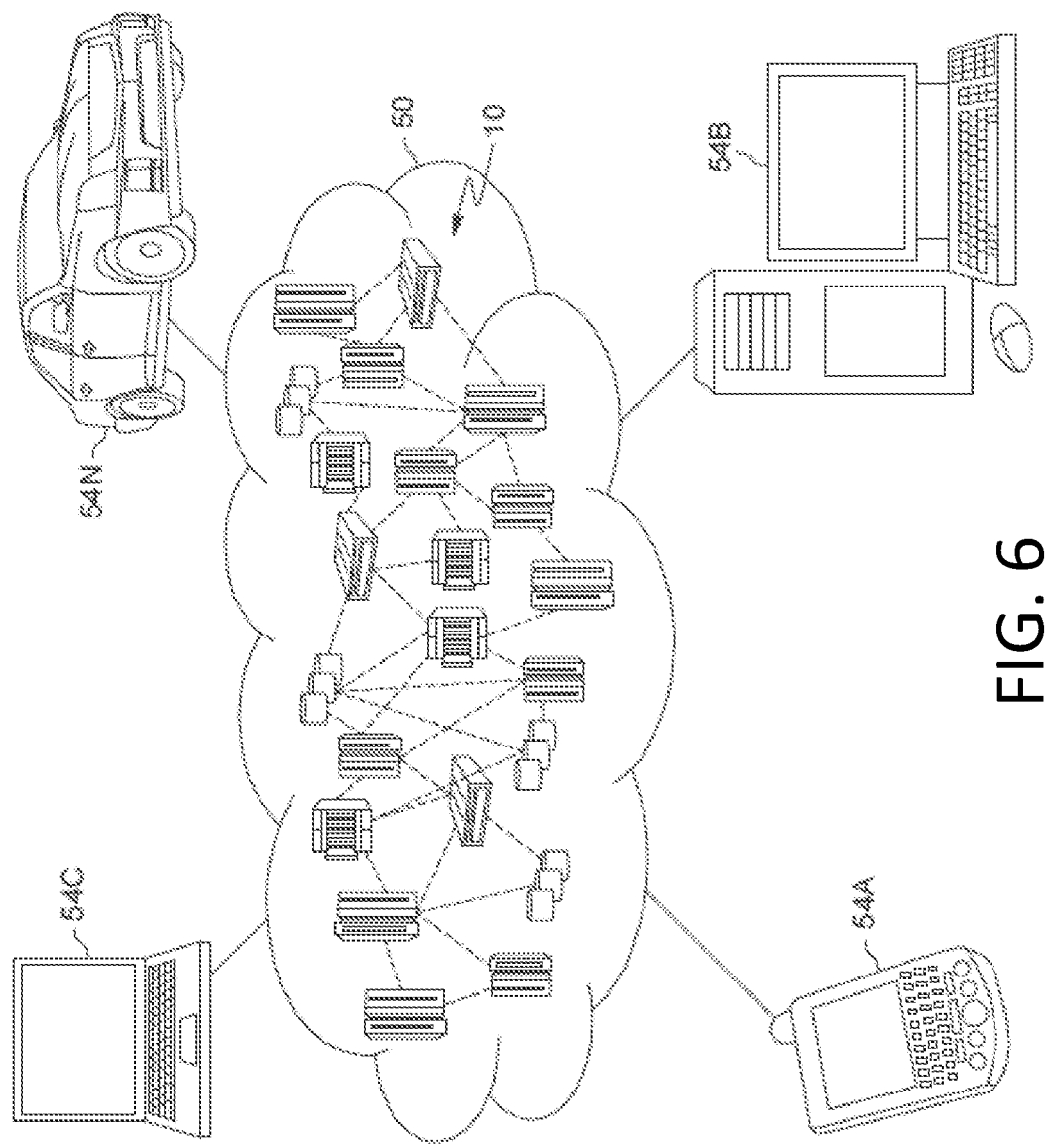
FIG. 6 depicts a cloud computing environment according to an embodiment of the present invention.
Figure 7:
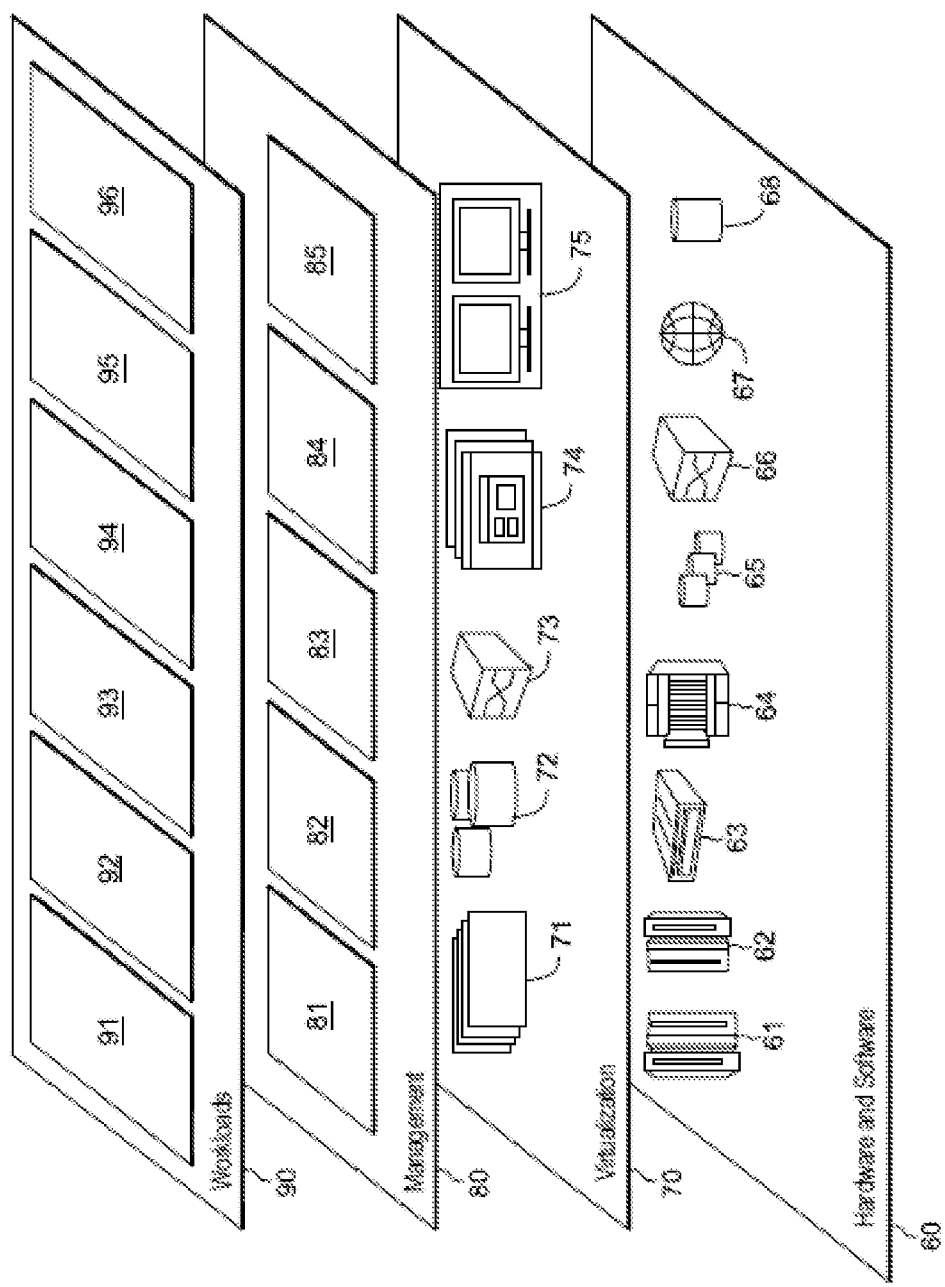
FIG. 7 depicts abstraction model layers according to an embodiment of the present invention.

FIGS. 5-7 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the homophily transfer learning engine 120 and the DTLN population 170 of FIG. 1, respectively. Program processes 42, as in the homophily transfer learning engine 120 and the DTLN population 170 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the homophily transfer learning 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    generating, by one or more processor, a plurality of deep transfer learning networks based on a plurality of first exemplars and a plurality of second exemplars, wherein a first subset of the first exemplars represents a source domain, a second subset of the first exemplars represents a target domain, and the second exemplars represent both the source domain and the target domain;
    encoding, by the one or more processor, one or more transfer layers to a chromosome for genetic operators, where the one or more transfer layers are to be transferred from a source deep transfer learning network corresponding to the source domain to a target deep transfer learning network corresponding to the target domain, wherein the plurality of deep transfer learning networks include both the source deep transfer learning network and the target deep transfer learning network;
    diversifying, by the one or more processor, concurrently both the source deep transfer learning network and the target deep transfer learning network by use of the genetic operators; and
    producing, by the one or more processor, the target deep transfer learning network that integrates a result from the diversifying on the source deep transfer learning network and that passes a predefined fitness threshold condition for the target deep transfer learning network.

2. The computer implemented method of claim 1, further comprising:
    prior to the encoding, training the source deep transfer learning network with the first subset of the first exemplars and the second exemplars; and
    prior to the encoding, and concurrently with the training the source deep transfer learning network, training the target deep transfer learning network with the second subset of the first exemplars and the second exemplars.

3. The computer implemented method of claim 1, further comprising:
    prior to the encoding, measuring a homophily influence of the source deep transfer learning network to the target deep transfer learning network.

4. The computer implemented method of claim 1, the diversifying comprising:
    mutating randomly the transfer layers of the source deep transfer learning network from the encoding.

5. The computer implemented method of claim 1, the diversifying comprising:
    ascertaining that respective transfer layers of two source deep transfer learning networks have their respective weights migrated over to the target deep transfer learning network for respectively passing a fitness threshold condition for the source deep transfer learning network; and
    crossing over the transfer layers of the target deep transfer learning network with the transfer layers of the two source deep transfer learning networks.

6. The computer implemented method of claim 1, the diversifying comprising:
    ascertaining that respective transfer layers of more than three source deep transfer learning networks have their respective weights migrated over to the target deep transfer learning network for respectively passing a fitness threshold condition for the source deep transfer learning network;
    selecting two source deep transfer learning networks from the more than three source deep transfer learning network from the ascertaining; and
    crossing over the transfer layers of the target deep transfer learning network with the transfer layers of the two source deep transfer learning networks from the selecting.

7. The computer implemented method of claim 1, wherein the predefined fitness threshold condition is determined based on the accuracy of the target deep transfer learning network as determined from an average between ground truths specific to the target domain and ground truths applicable for both the source domain and the target domain.

8. A computer program product comprising:
    a computer readable storage medium readable by one or more processor and storing instructions for execution by the one or more processor for performing a method comprising:
    generating a plurality of deep transfer learning networks based on a plurality of first exemplars and a plurality of second exemplars, wherein a first subset of the first exemplars represents a source domain, a second subset of the first exemplars represents a target domain, and the second exemplars represent both the source domain and the target domain;
    encoding one or more transfer layers to a chromosome for genetic operators, where the one or more transfer layers are to be transferred from a source deep transfer learning network corresponding to the source domain to a target deep transfer learning network corresponding to the target domain, wherein the plurality of deep transfer learning networks include both the source deep transfer learning network and the target deep transfer learning network;
    diversifying concurrently both the source deep transfer learning network and the target deep transfer learning network by use of the genetic operators; and
    producing the target deep transfer learning network that integrates a result from the diversifying on the source deep transfer learning network and that passes a predefined fitness threshold condition for the target deep transfer learning network.

9. The computer program product of claim 8, further comprising:

prior to the encoding, training the source deep transfer learning network with the first subset of the first exemplars and the second exemplars; and prior to the encoding, and concurrently with the training the source deep transfer learning network, training the target deep transfer learning network with the second subset of the first exemplars and the second exemplars.

10. The computer program product of claim 8, further comprising:

prior to the encoding, measuring a homophily influence of the source deep transfer learning network to the target deep transfer learning network.

11. The computer program product of claim 8, the diversifying comprising:

mutating randomly the transfer layers of the source deep transfer learning network from the encoding.

12. The computer program product of claim 8, the diversifying comprising:

ascertaining that respective transfer layers of two source deep transfer learning networks have their respective weights migrated over to the target deep transfer learning network for respectively passing a fitness threshold condition for the source deep transfer learning network; and crossing over the transfer layers of the target deep transfer learning network with the transfer layers of the two source deep transfer learning networks.

13. The computer program product of claim 8, the diversifying comprising:

ascertaining that respective transfer layers of more than three source deep transfer learning networks have their respective weights migrated over to the target deep transfer learning network for respectively passing a fitness threshold condition for the source deep transfer learning network;

selecting two source deep transfer learning networks from the more than three source deep transfer learning network from the ascertaining; and crossing over the transfer layers of the target deep transfer learning network with the transfer layers of the two source deep transfer learning networks from the selecting.

14. The computer program product of claim 8, wherein the predefined fitness threshold condition is determined based on the accuracy of the target deep transfer learning network as determined from an average between ground truths specific to the target domain and ground truths applicable for both the source domain and the target domain.

15. A system comprising:

a memory;

one or more processor in communication with the memory; and program instructions executable by the one or more processor via the memory to perform a method comprising:

generating a plurality of deep transfer learning networks based on a plurality of first exemplars and a plurality of second exemplars, wherein a first subset of the first exemplars represents a source domain, a second subset of the first exemplars represents a target domain, and the second exemplars represent both the source domain and the target domain;

encoding one or more transfer layers to a chromosome for genetic operators, where the one or more transfer layers are to be transferred from a source deep transfer learning network corresponding to the source domain to a target deep transfer learning network corresponding to the target domain, wherein the plurality of deep transfer learning networks include both the source deep transfer learning network and the target deep transfer learning network;

diversifying concurrently both the source deep transfer learning network and the target deep transfer learning network by use of the genetic operators; and producing the target deep transfer learning network that integrates a result from the diversifying on the source deep transfer learning network and that passes a predefined fitness threshold condition for the target deep transfer learning network, wherein the predefined fitness threshold condition is determined based on the accuracy of the target deep transfer learning network as determined from an average between ground truths specific to the target domain and ground truths applicable for both the source domain and the target domain.

16. The system of claim 15, further comprising:

prior to the encoding, training the source deep transfer learning network with the first subset of the first exemplars and the second exemplars; and prior to the encoding, and concurrently with the training the source deep transfer learning network, training the target deep transfer learning network with the second subset of the first exemplars and the second exemplars.

17. The system of claim 15, further comprising:

prior to the encoding, measuring a homophily influence of the source deep transfer learning network to the target deep transfer learning network.

18. The system of claim 15, the diversifying comprising:

mutating randomly the transfer layers of the source deep transfer learning network from the encoding.

19. The system of claim 15, the diversifying comprising:

ascertaining that respective transfer layers of two source deep transfer learning networks have their respective weights migrated over to the target deep transfer learning network for respectively passing a fitness threshold condition for the source deep transfer learning network; and crossing over the transfer layers of the target deep transfer learning network with the transfer layers of the two source deep transfer learning networks.

20. The system of claim 15, the diversifying comprising:

ascertaining that respective transfer layers of more than three source deep transfer learning networks have their respective weights migrated over to the target deep transfer learning network for respectively passing a fitness threshold condition for the source deep transfer learning network;

selecting two source deep transfer learning networks from the more than three source deep transfer learning network from the ascertaining; and crossing over the transfer layers of the target deep transfer learning network with the transfer layers of the two source deep transfer learning networks from the selecting.

21. A computer implemented method comprising:

generating, by one or more processor, a plurality of deep transfer learning networks based on a plurality of first exemplars and a plurality of second exemplars, wherein a first subset of the first exemplars represents a source domain, a second subset of the first exemplars represents a target domain, and the second exemplars represent both the source domain and the target domain;

training, by the one or more processor, a source deep transfer learning network with the first subset of the first exemplars and the second exemplars;

encoding, by the one or more processor, one or more transfer layers to a chromosome for genetic operators, where the one or more transfer layers are to be transferred from a source deep transfer learning network corresponding to the source domain to a target deep transfer learning network corresponding to the target domain, wherein the plurality of deep transfer learning networks include both the source deep transfer learning network and the target deep transfer learning network;

mutating, by the one or more processor, randomly the transfer layers of the source deep transfer learning network from the encoding;

ascertaining, by the one or more processor, that a fitness threshold condition for the source deep transfer learning network is satisfied; and migrating, by the one or more processor, weights of respective transfer layers of two or more source deep transfer learning networks over to the target deep transfer learning network respectively.

22. The computer implemented method of claim 21, further comprising:

prior to the encoding, measuring a homophily influence of the source deep transfer learning network to the target deep transfer learning network.

23. A computer implemented method comprising:

generating, by one or more processor, a plurality of deep transfer learning networks based on a plurality of first exemplars and a plurality of second exemplars, wherein a first subset of the first exemplars represents a source domain, a second subset of the first exemplars represents a target domain, and the second exemplars represent both the source domain and the target domain;

training, by the one or more processor, a target deep transfer learning network with the second subset of the first exemplars and the second exemplars;

encoding, by the one or more processor, one or more transfer layers to a chromosome for genetic operators, where the one or more transfer layers are to be transferred from a source deep transfer learning network corresponding to the source domain to a target deep transfer learning network corresponding to the target domain, wherein the plurality of deep transfer learning networks include both the source deep transfer learning network and the target deep transfer learning network;

ascertaining, by the one or more processor, that respective transfer layers of two source deep transfer learning networks have their respective weights migrated over to the target deep transfer learning network for respectively passing a fitness threshold condition for the source deep transfer learning network;

crossing over, by the one or more processor, the transfer layers of the target deep transfer learning network with the transfer layers of the two source deep transfer learning networks from the ascertaining; and producing, by the one or more processor, the target deep transfer learning network that integrates a result from the crossing over on the target deep transfer learning network and that passes a predefined fitness threshold condition for the target deep transfer learning network.

24. The computer implemented method of claim 23, further comprising:

prior to the crossing over, randomly selecting the two source deep transfer learning network from a pool of source deep transfer learning networks that had migrated over respective weights of the transfer layers.

25. The computer implemented method of claim 23, further comprising:

integrating the result from the crossing over on the target deep transfer learning network;

determining that the target deep transfer learning network does not pass the predefined fitness threshold condition for the target deep transfer learning network; and proceeding with the generating for another plurality of deep transfer learning networks.

* * * * *